United States Patent [19]
Pemper et al.

[11] Patent Number: 5,489,779
[45] Date of Patent: Feb. 6, 1996

[54] METHOD FOR OPTIMIZING ENERGY SPECTRUM DATA FROM SCINTILLATION TYPE RADIATION DETECTORS

[75] Inventors: Richard R. Pemper, Sugar Land; Enrique J. Prati, Houston, both of Tex.

[73] Assignee: Western Atlas International, Inc., Houston, Tex.

[21] Appl. No.: 323,235

[22] Filed: Oct. 14, 1994

[51] Int. Cl.⁶ .............................. G01T 1/17; G01V 5/04
[52] U.S. Cl. ............................................ 250/369; 250/262
[58] Field of Search ...................... 250/261, 262, 250/336.1, 369, 395, 390.11; 364/422, 498

[56] References Cited

U.S. PATENT DOCUMENTS

| | | | |
|---|---|---|---|
| 4,471,435 | 9/1984 | Meisner | 250/262 X |
| 5,055,675 | 10/1991 | Bridges | 364/422 X |
| 5,067,090 | 11/1991 | Seeman | 250/262 X |
| 5,289,386 | 2/1994 | Anderson | 364/498 |

*Primary Examiner*—Carolyn E. Fields
*Assistant Examiner*—Edward J. Glick
*Attorney, Agent, or Firm*—Richard A. Fagin

[57] ABSTRACT

The present invention is a system for analyzing the energy levels of radiation detected by a radiation detector having a multichannel pulse height analyzer. The radiation detector generates signals representative of the energy level of the detected radiation, and the analyzer increments a particular channel dependent on the signal from the detector. The channel incremented by the analyzer is in response to an empirical relationship of the particular channel with respect to energy level. The empirical relationship is determined so that energy spectral peaks occurring over substantially the entire energy detection range of the detector have peak widths spanning substantially equal numbers of analyzer channels. In one embodiment of the invention, the detector is a scintillation counter responsive to gamma ray radiation. In one embodiment of the invention, the empirical relationship is approximated by an ordered expression comprising a third order polynomial function.

15 Claims, 10 Drawing Sheets

METHOD FOR OPTIMIZING ENERGY SPECTRUM DATA FROM SCINTILLATION TYPE RADIATION DETECTORS

BACKGROUND OF THE INVENTION

1. Field of the Invention

The present invention is related to the field of radiation detecting devices. More specifically, the present invention is related to methods of determining various elemental concentrations by analysis of the energy spectra of detected radiation.

2. Discussion of the Relevant Art

Radioactive isotopes, which can be present in materials such as earth formations, emit several different types of radiation which can be detected by various types of radiation detectors. In other cases, induced radiation can be emitted from earth formations by introducing radioactive sources into the formations.

For example, gamma ray radiation can be particularly useful for determining the amounts of specific radioactive isotopes which may be present in the materials, because each different isotope emits gamma rays having characteristic energy levels. Amounts of other elements present in the materials can be determined by detection of induced gamma rays, which also have characteristic energy levels. Induced gamma rays are emitted when the elements are present and, for example, neutron sources are introduced into earth formations containing the elements. Radiation detectors have been devised which can determine the energy levels of the gamma rays which are detected.

A type of radiation detector known in the art which can be used to determine the energy levels of the impinging radiation is called a scintillation detector. The scintillation detector typically comprises a single, large crystal composed of a material such as cesium iodide (CsI), sodium iodide (NaI), or bismuth germanate (BGO). Gamma rays entering the crystal cause the crystal to emit a small flash of light, or scintillation. Scintillations typically have a magnitude proportional to the energy level of the gamma ray which caused the scintillation.

The scintillations are optically coupled from the crystal to a photomultiplier tube. The photomultiplier tube emits a voltage pulse which is proportional in amplitude to the magnitude of the scintillation. The voltage pulses can be conducted to various circuits for analysis of the amplitudes of the individual pulses.

Analysis of the numbers of pulses having certain amplitudes corresponding to various energy levels of gamma rays can provide information about the presence of certain elements or isotopes. A graphic representation of the number of pulses occurring with respect to the energy level of the pulses typically displays localized maxima, called "peaks" at several energy levels within the energy range of the scintillation detector, which typically is some portion of the range of 0.1 to 10 million electron volts (MeV), depending on the crystal type and the elements intended to be resolved. The peaks also have a range of energy levels characteristic to the isotope. The range of energy levels is typically defined as the width (on an MeV scale) of the peak at half its maximum value, as will be explained further.

The amplitudes of the voltage pulses are typically analyzed by using a device called a spectral analyzer. The spectral analyzer comprises a pulse height quantizer for measuring the amplitude of each voltage pulse from the photomultiplier, and a storage device for counting the number of voltage pulses of each magnitude determined by the quantizer. Based on the amplitude measurement made by the quantizer, a quantization value called a channel number is assigned to each measured pulse. Each pulse leaving the quantizer increments a particular storage buffer in the storage device corresponding to the channel number determined for each pulse by the quantizer. At the end of any measurement period, the number of events counted in each buffer is used for analysis.

Many spectral analyzers assign channel numbers based on a linear scaling of apparent amplitude of the voltage pulses. Linear scaling means that the channel number is linearly proportional to the amplitude of the voltage pulse, and therefore the apparent energy level of the detected gamma ray which caused the pulse.

One of the drawbacks to linear scaling is that certain elements generate a plurality of energy peaks, spaced closely together in energy level, near the lower end of the energy range of the scintillation detector, which is typically about 100 to 300 thousand electron volts (keV). It is frequently difficult, using linearly scaled channel number assignment, to discriminate between elements having a plurality of peaks in the lower energy range of the detector because an insufficient number of analyzer channels is assigned to the lower energy levels to adequately resolve the peaks.

A method known in the art for improving the peak resolution of the spectral analyzer in the lower end of the detector energy range is disclosed in U.S. Pat. No. 5,289,386, issued to Anderson. The method disclosed in the Anderson patent assigns channel numbers to energy levels using a second order polynomial expression having the form:

$$E = a + bN^2 \qquad (1)$$

where a and b are constants which fit a particular crystal and photomultiplier type to the channel analyzer, E is the gamma ray energy level, and N is the channel number. Channel analyzers known in the art typically have 256 channels, numbered zero to 255, which defines the typical range for N.

The method disclosed in the Anderson patent for energy definition of channel numbers still provides inadequate resolution at the lower energy end of the detector range, and unnecessarily high resolution at the upper end of the detector energy range.

It is an object of the present invention to provide a method of assigning channel numbers in a channel analyzer to provide nearly constant numbers of assigned channels for resolving emission spectra occurring throughout the energy detection range of a scintillation counter.

SUMMARY OF THE INVENTION

The present invention is a system for analyzing the energy levels of radiation detected by a radiation detector having a multichannel pulse height analyzer. The radiation detector generates signals representative of the energy level of the detected radiation, and the analyzer increments a particular channel dependent on the signal from the detector. The channel incremented by the analyzer is in response to an empirical relationship of the particular channel with respect to energy level. The empirical relationship is determined so that energy spectral peaks occurring over substantially the entire energy detection range of the detector have peak widths spanning substantially equal numbers of analyzer channels.

In one embodiment of the invention, the detector is a scintillation counter responsive to gamma ray radiation.

In one embodiment of the invention, the empirical relationship is approximated by an ordered expression comprising a third order polynomial function.

DESCRIPTION OF THE PREFERRED EMBODIMENT

Figure 1:
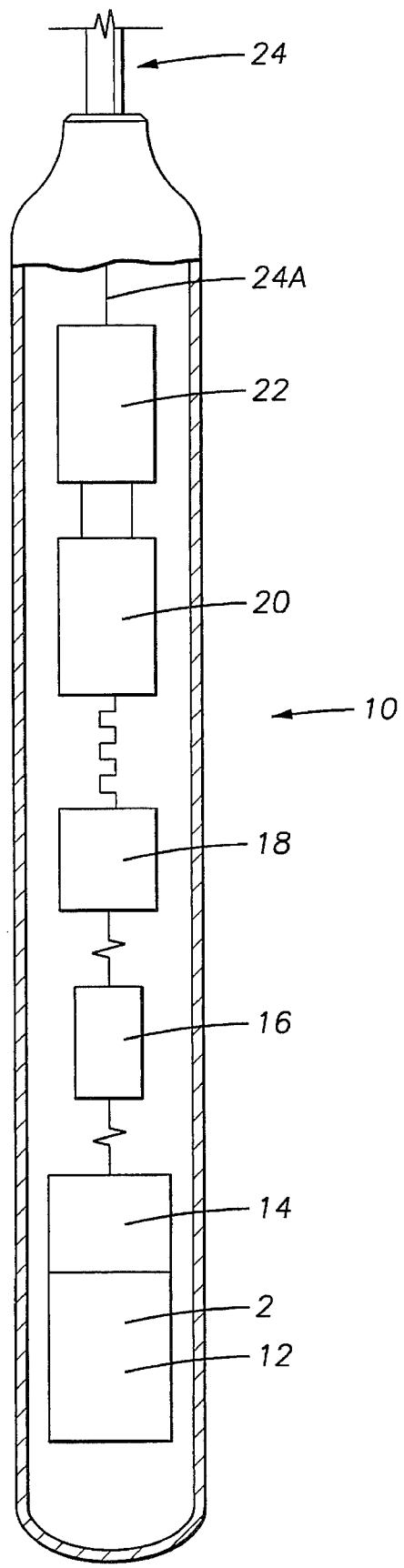
FIG. 1 shows a typical scintillation counter radiation detector as it is used in a wellbore logging instrument.

FIG. 1 shows a typical gamma ray scintillation counter radiation detector as intended to be used for radiospectroscopy of earth formations penetrated by a wellbore. Inside a pressure resistant instrument housing 10 is a scintillation detector crystal 12 attached to a photomultiplier tube 14. Radioactive sources 2 which in this embodiment can be earth formations (not shown) emit radiation which is detected by the crystal 12, causing scintillations within the crystal 12. The scintillations have magnitudes proportional to the energy of the radiation which generated the scintillation. The scintillations are optically conducted to the photomultiplier 14 where they are converted into voltage pulses each having an amplitude proportional to the magnitude of the scintillation which caused the pulse.

Voltage pulses from the photomultiplier 14 are conducted to a buffer amplifier 16 in which the pulses are amplified and shaped for further analysis. The buffer amplifier 16 also blocks pulses from the photomultiplier 14 which are unlikely to have been caused by detection of a scintillation. The blocked pulses include so-called "dark-currents" which are typically caused by thermal noise in the photomultiplier, and can be blocked by a voltage threshold discriminator in the buffer amplifier. Pulses which are processed in the buffer 18 are then conducted to a pulse height analyzer 18 for amplitude measurement and channel assignment. The pulse height analyzer 18 typically comprises an analog-to-digital converter and a storage buffer. The analog to digital converter measures the amplitude of each incoming pulse and generates a number corresponding to the measured pulse amplitude. The storage buffer typically comprises 256 channels, each of the channels being programmed to increment an event counter when an incoming number from the analog-to-digital converter, representing a pulse amplitude, is determined to be within a predetermined range assigned to that particular channel. The predetermined range corresponding to each analyzer channel is programmed to match a predetermined relationship of energy with respect to channel number.

Information concerning the numbers of pulses detected and stored as event counts in each storage buffer channel can be transmitted to analysis equipment (not shown) located at the earth's surface by means of a microprocessor 20 which interrogates the storage buffers in the analyzer 18, and a digital transceiver 22 disposed within the housing 10. Signals from the transceiver 22 are conducted to the earth's surface by an armored electrical cable 24 comprising at least one insulated electrical conductor 24A.

The improvement over the prior art provided by the present invention can be better understood by examining Table 1. Table 1 shows a comparison of the numbers of analyzer channels available to resolve spectral peaks occurring over the entire energy range of a detector using different relationships of analyzer (shown as 18 in FIG. 1) channel number with respect to energy level.

TABLE 1

Numbers of analyzer channels covering different spectral peaks of various radioisotopes using a 2 × 12 inch CsI crystal

| RADIO-ISOTOPE | PEAK ENERGY (MeV) | PEAK WIDTH (MeV) | A | B | C | D | E | F | G |
|---|---|---|---|---|---|---|---|---|---|
| $U^{238}$ | 0.245 | 0.063 | 12 | 5 | 7 | 7 | 11 | 12 | 12 |
| $U^{238}$ | 0.295 | 0.072 | 12 | 5 | 8 | 7 | 11 | 11 | 12 |
| $U^{238}$ | 0.352 | 0.082 | 12 | 6 | 8 | 8 | 11 | 11 | 11 |
| $U^{238}$ | 0.609 | 0.126 | 12 | 9 | 10 | 9 | 11 | 11 | 11 |
| $U^{238}$ | 1.120 | 0.203 | 12 | 15 | 12 | 11 | 12 | 12 | 12 |
| $K^{40}$ | 1.461 | 0.247 | 12 | 18 | 13 | 12 | 12 | 12 | 12 |
| $U^{238}$ | 1.765 | 0.281 | 12 | 20 | 14 | 12 | 12 | 12 | 12 |
| $Th^{232}$ | 2.614 | 0.351 | 12 | 25 | 14 | 13 | 11 | 11 | 11 |

Predetermined radioisotopes shown in Table 1 were chosen to generate spectral peaks for determining an optimal relationship of channel number with respect to energy level. The isotopes chosen are commonly found in earth formations. It is contemplated that other radioisotopes can be used to generate different energy spectra, and therefore different relationships of energy level to channel number, depending on the energy range of the particular detector used.

The spectral peak energy values for the radioisotopes in Table 1 were determined by laboratory analysis as described for example in, "Scintillation Spectrometry Gamma Ray Spectrum Catalogue", by R. L. Heath, U. S. Atomic Energy Commission, 1964, and "Gamma Ray Spectrum Catalog, Ge(Li) and Si(Li) Spectrometry", by R. L. Heath, U. S. Atomic Energy Commission, 1974. The peak width for each spectral peak is defined as the energy range spanning three standard deviations above, and three standard deviations below the mean peak energy after removal of the background radiation detections.

The spectral peaks in Table 1 are references for which an optimal relationship can be generated with which to assign analyzer 18 channels with respect to energy level. The optimal relationship can be determined by selecting an equal number of channels to span each peak in the spectrum corresponding to the predetermined radioisotopes, thereby determining energy widths for each channel at each of the peaks. The relationship of channel number with respect to energy is related to the total number of channels in the analyzer, which in this embodiment can be 256, and is related to the energy range of the analyzer, which in this embodiment can be 0 to 3 MeV.

Column A shows the number of analyzer channels, twelve, in which each spectral peak for the predetermined radioisotope spectra in Table 1 would fit within an equal number of analyzer channels over the energy range 0 to 3 MeV of the detector, and the total number of analyzer channels, which in this embodiment can be 256. Column A represents the optimal relationship of channel number with respect to energy level.

In the present embodiment of the invention, an ordered expression can be used to mathematically approximate the empirically determined optimal relationship so that the analyzer 18 can be more easily programmed. Comparison of the number of channels spanning various peaks using different types of ordered expressions is shown in columns B through G of Table 1.

Column B represents the number of channels fitting the width of each of the same spectral peaks using a linear relationship of channel number with respect to energy level. Column C represents the number of channels fitting the energy width of each of the peaks using the relationship disclosed in U.S. Pat. No. 5,289,386, to Anderson, and therefore provides a reference for quantifying the improvement over the prior art which is provided by the present invention.

Columns D through G represent the number of channels fitting each of the spectral peaks using polynomial functions of channel number with respect to energy level. Expressed in terms of energy level, E, the polynomial functions have the generalized form:

$$E = a_1 + a_2 N + a_3 N^2 + a_4 N^3 + a_5 N^4 + \ldots + a_m N^{m-1} \quad (2)$$

where N is the channel number, $a_1$ through $a_m$ are constants, and m is an integer. In Table 1, the value of m is 2 in column D, through 5 in column G. Coefficients $a_1$ through $a_m$ can be determined, for example, by a computer program which calculates coefficients for a best fit curve having a predetermined maximum value of m.

In the present embodiment of the invention, a third order polynomial function of channel number with respect to energy level can provide a variation of only one channel spanning any spectral peak over substantially the entire energy range of the detector. Less variation with respect to the empirical relationship can be obtained using polynomial functions of order higher than three, as shown in columns F and G in Table 1. The spectra used in Table 1 were generated using a 2×12 inch Cesium Iodide (CsI) scintillation crystal and an analyzer 18 comprising 256 channels having an energy range of 0 to 3.5 MeV. It is contemplated that different types of detector crystals, such as Bismuth Germanate (BGO) be used with a 256 channel analyzer to cover an energy range of 0 to 10 MeV. It is further contemplated that an analyzer having more than or fewer than 256 channels could be used with the present invention.

It is further contemplated that other types of ordered expressions can be used to represent the relationship between energy level and channel number, for example, power functions having the form:

$$E = \Sigma a_m N^{x_m} \quad (3)$$

where E is the energy level, $a_m$ and $X_m$ are coefficients, and $A'$ is the channel number. Other types of ordered expressions could provide similar correspondence between the empirical relationship and the relationship used to assign analyzer 18 channels for certain predetermined energy spectra.

Figure 2:
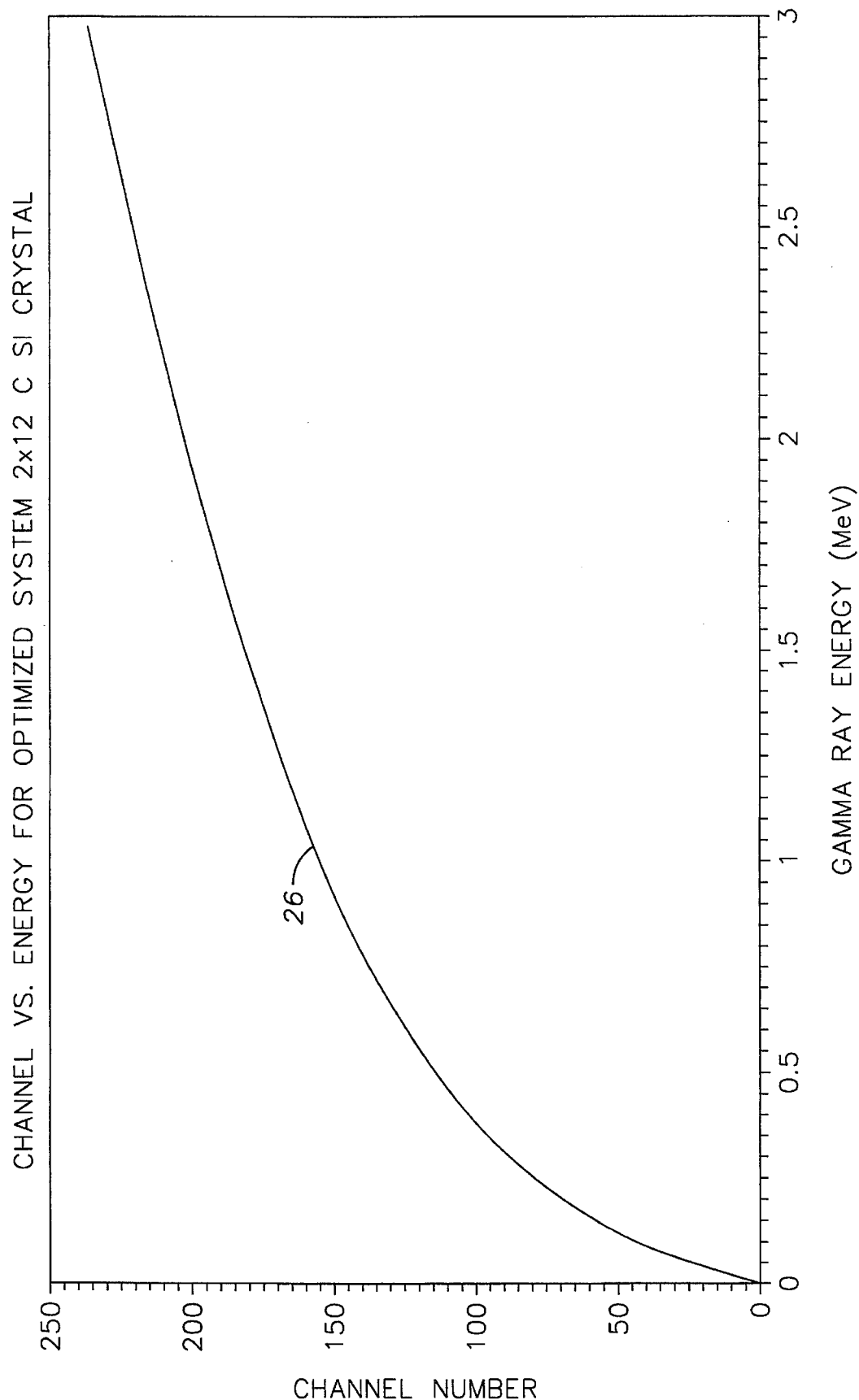
FIG. 2 shows a graphic representation of the empirical relationship between channel number and energy level.

FIG. 2 is a graphic representation of the empirical relationship of channel number with respect to energy level in which twelve channels of the 256 channels in the analyzer are assigned to each of the energy peaks of the radioisotopes of earth formations shown in Table 1. A smooth curve 26 has been fit through the discrete data, which are also shown in Table 1.

Figure 3:
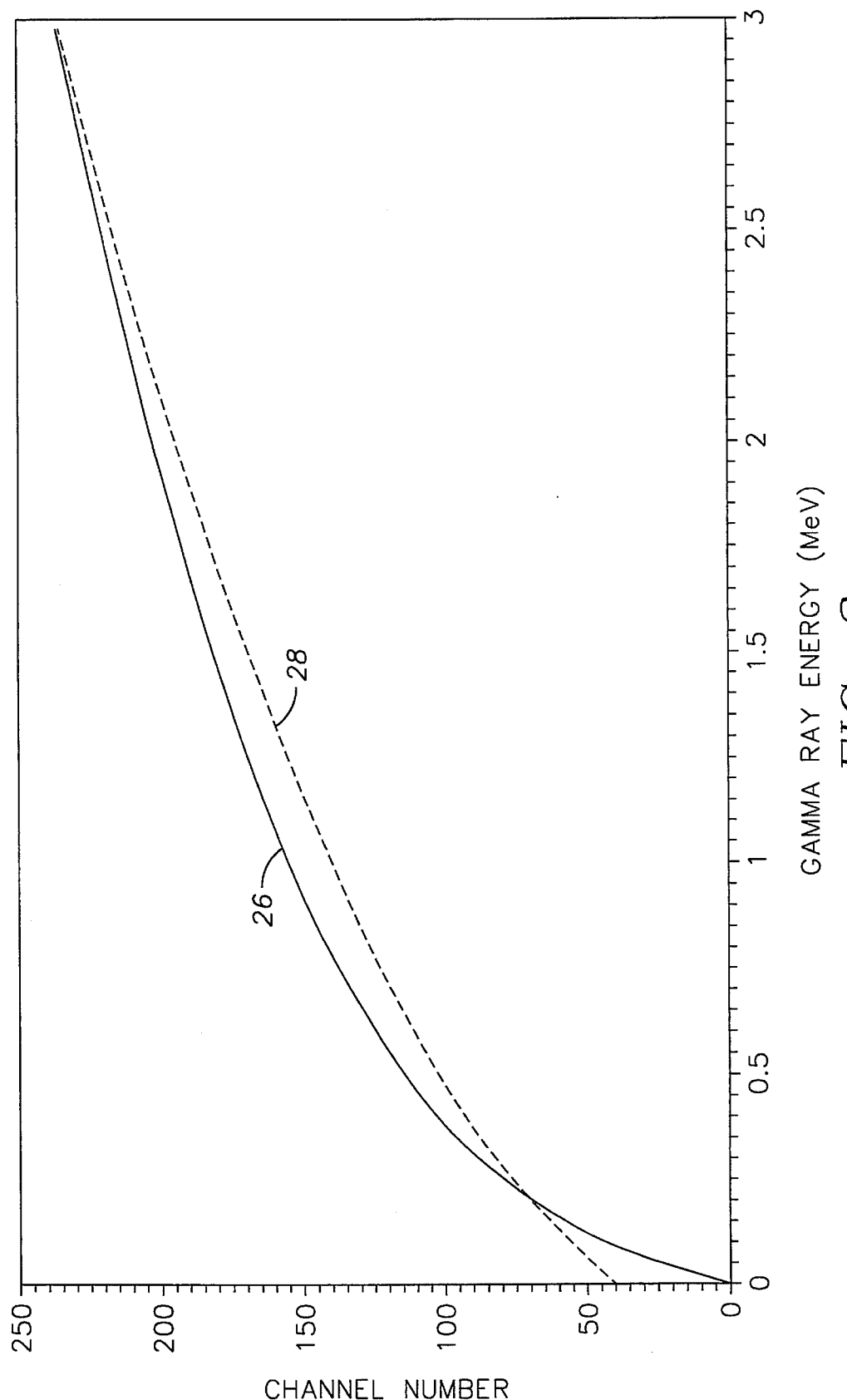
FIG. 3 shows a graphic representation of the relationship between channel number as disclosed in the prior art.

FIG. 3 shows a comparison of the empirical curve 26 with a curve 28 generated by the relationship disclosed in U.S. Pat. No. 5,289,386 to Anderson. The relationship in the Anderson patent exhibits a distinct difference from the empirical curve 26 in the 0.8 to 2.0 MeV range, and in the 0 to 0.3 MeV range.

Figure 4:
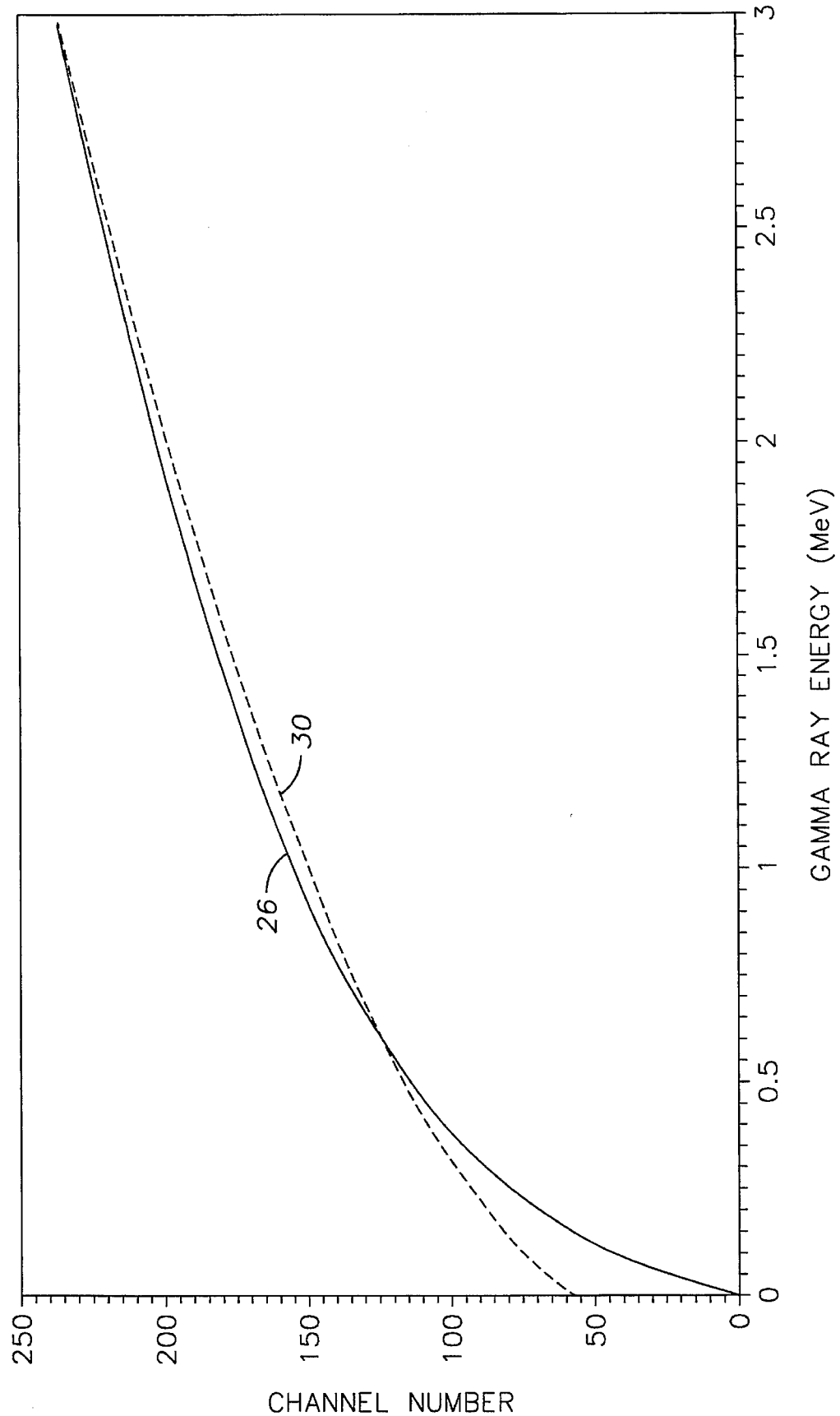
FIG. 4 shows a graphic representation of a quadratic relationship.

FIG. 4 shows a comparison of the empirical curve 26 with a curve 30 generated by use of a second power polynomial relationship. The correspondence between the empirical curve 26 and the polynomial curve 30 is improved at energy levels above 0.8 MeV relative to the curve 28 in FIG. 3, but shows significant difference from the empirical curve 26 at lower energy levels. While the ordered expression disclosed in U.S. Pat. No. 5,289,386 is a second order expression, the coefficient of the first order term, $a_2$ is equal to zero. U.S. Pat. No. 5,289,386 does not disclose the possibility that the first order coefficient may be non-zero for any empirical relationship.

Figure 5:
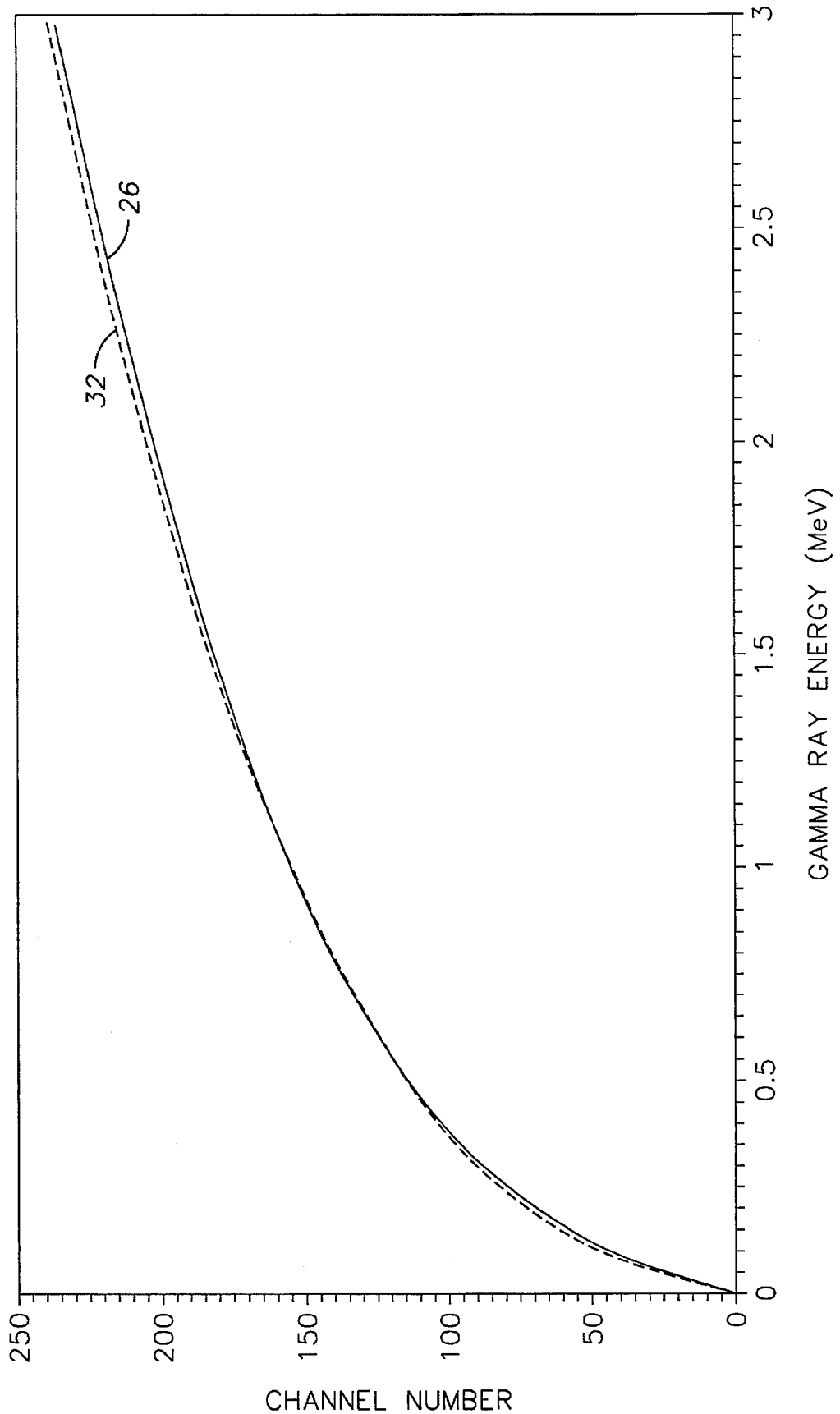
FIG. 5 shows a graphic representation of a third power polynomial function relationship.

FIG. 5 shows a comparison of the empirical curve 26 with a third power polynomial curve 32. There is good correspondence between the curves 26, 32 over the entire energy range of the detector.

Figure 6:
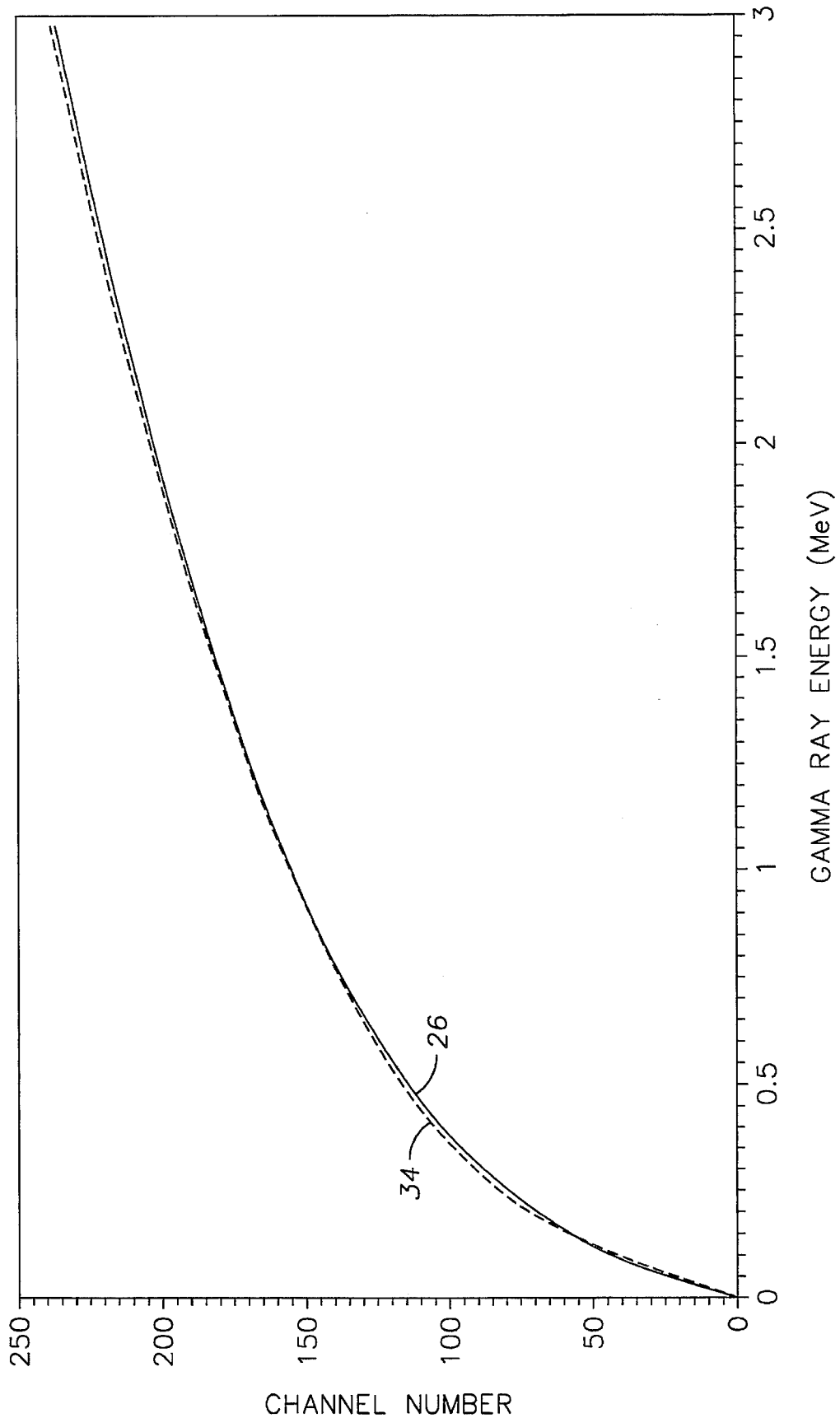
FIG. 6 shows a graphic representation of a fourth power polynomial function relationship.

FIG. 6 shows a comparison of the empirical curve 26 with a fourth power polynomial curve 34. The fourth power curve 34 shows a high degree of correspondence with the empirical curve 26.

Figure 7:
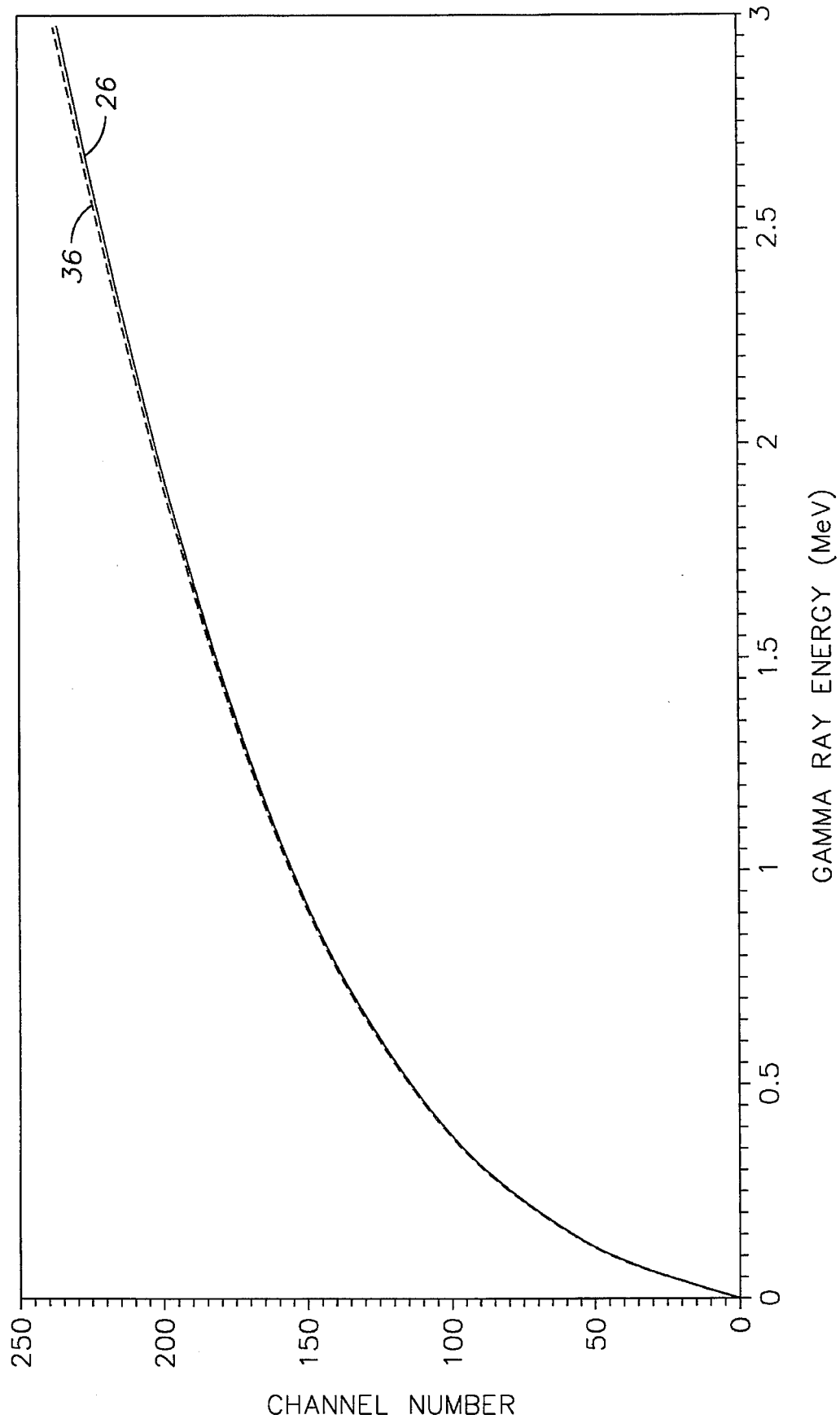
FIG. 7 shows a graphic representation of a fifth power polynomial relationship.

FIG. 7 shows a comparison of the empirical curve 26 with a fifth power polynomial curve 36. The fifth power curve 36 shows a high degree of correspondence with the empirical curve.

In the present embodiment of the invention, the analyzer (shown as 18 in FIG. 1) is typically programmed to assign channels in response to detected gamma ray energy levels using a third power polynomial function of channel number with respect to energy level. More specifically, in the present embodiment of the invention, the third power function as shown in FIG. 5 typically has coefficients $a_1 = 1.1119 \times 10^{-3}$; $a_2 = 1.2906 \times 10^{-3}$; $a_3 = 4.95469 \times 10^{-6}$; and $a_4 = 1.7649913 \times 10^{-7}$. It is contemplated that the values of the coefficients determined for the present embodiment can be different for different sizes or compositions of scintillation detector (shown as 12 in FIG. 1).

Referring back to FIG. 1, when the instrument 10 is operated, gamma rays 2 detected by the detector 12 will result in various numbers of counts, corresponding to the numbers of detected gamma rays 2 having energy levels corresponding to the energy levels assigned to the channels in the analyzer 18, being stored in the various channels in the analyzer 18. Periodically the analyzer 18 can be interrogated by the microprocessor 20 so that count data from each channel can be analyzed. Typically count data is correlated to count data corresponding to radioisotopes analyzed in a laboratory, such as shown in Table 1. An output of the step of correlation can include a graph (not shown) of relative concentrations of various radioisotopes.

TEST RESULTS

Figure 8:
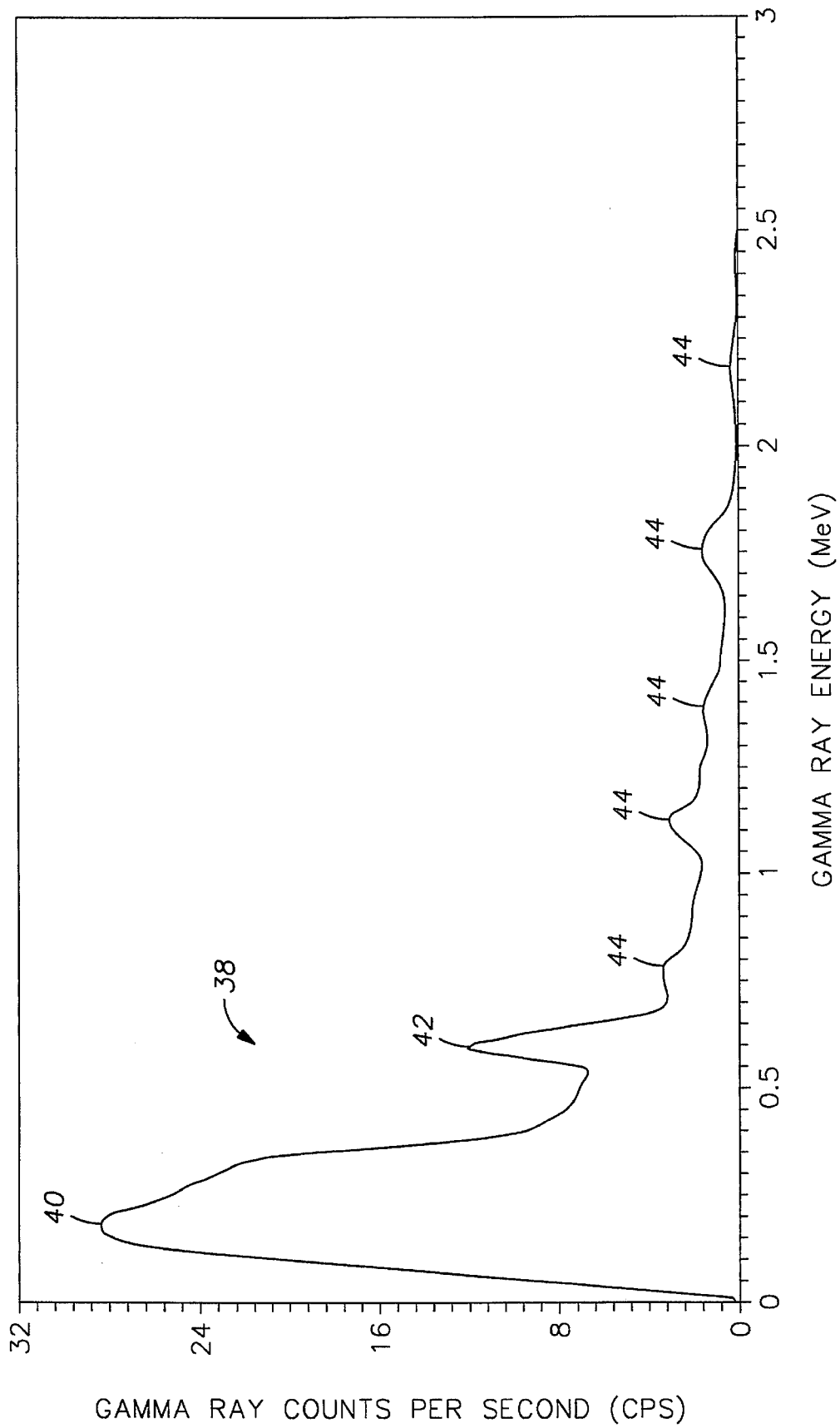
FIG. 8 shows a spectral analysis of Radium$^{226}$ emissions using a linear channel number relationship.

The logging instrument (shown as 10 in FIG. 1) was first programmed to enable the analyzer 18 to assign channel numbers with respect to energy level using a linear relationship. FIG. 8 shows a graphic representation of a gamma ray spectrum of Radium-226 emissions detected by the instrument 10 having the analyzer 18 programmed with the linear relationship. Numbers corresponding to counts stored in individual analyzer 18 channels have been filtered into a smooth curve 38 to reduce the effects of statistical variations in the spectral analysis. A large peak which is characteristic of the Radium-226 spectrum is shown at 40. A secondary peak which is also characteristic of the Radium-226 spectrum is shown at 42. Much smaller spectral peaks are shown at 44.

Figure 9:
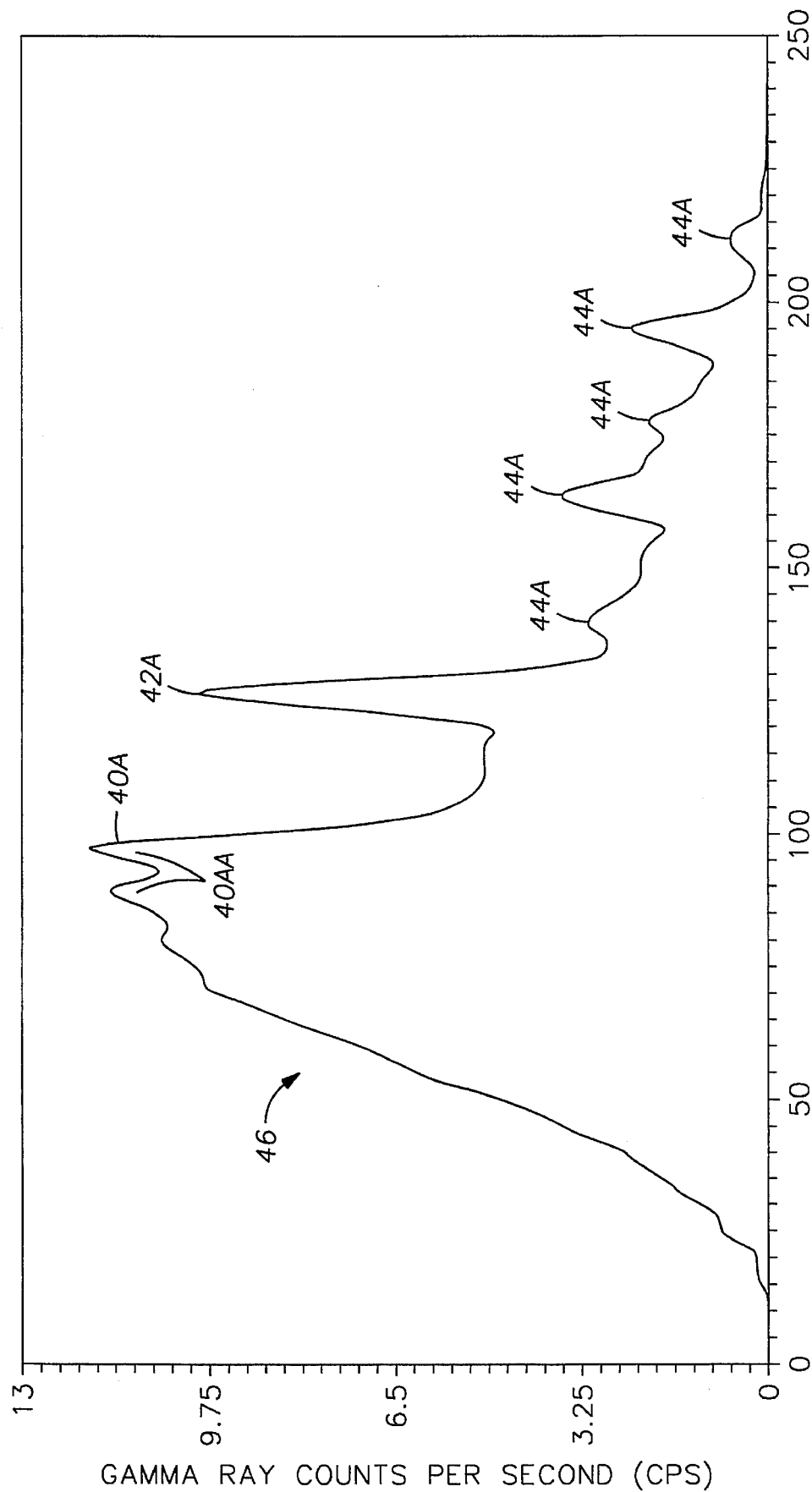
FIG. 9 shows a spectral analysis in terms of analyzer channel number of Radium$^{226}$ emissions using the polynomial function channel number relationship of an embodiment of the present invention.

FIG. 9 shows a graphic representation of the same Radium-226 spectrum, but this time using the third power relationship of the present embodiment of the invention to assign channel numbers to the various voltage pulses entering the analyzer 18. The individual analyzer 18 count rate numbers have again been filtered into a smooth curve 46. Peaks 40A, 42A, 44A, corresponding to equivalent peaks 40, 42, 44 in the curve of FIG. 8, exhibit markedly different relative amplitudes than the peaks of FIG. 8. In particular, the secondary peaks 44A are much more clearly defined, and the primary peak 40A exhibits several smaller perturbations 40AA which were not visible in the spectrum graph of FIG. 8.

Figure 10:
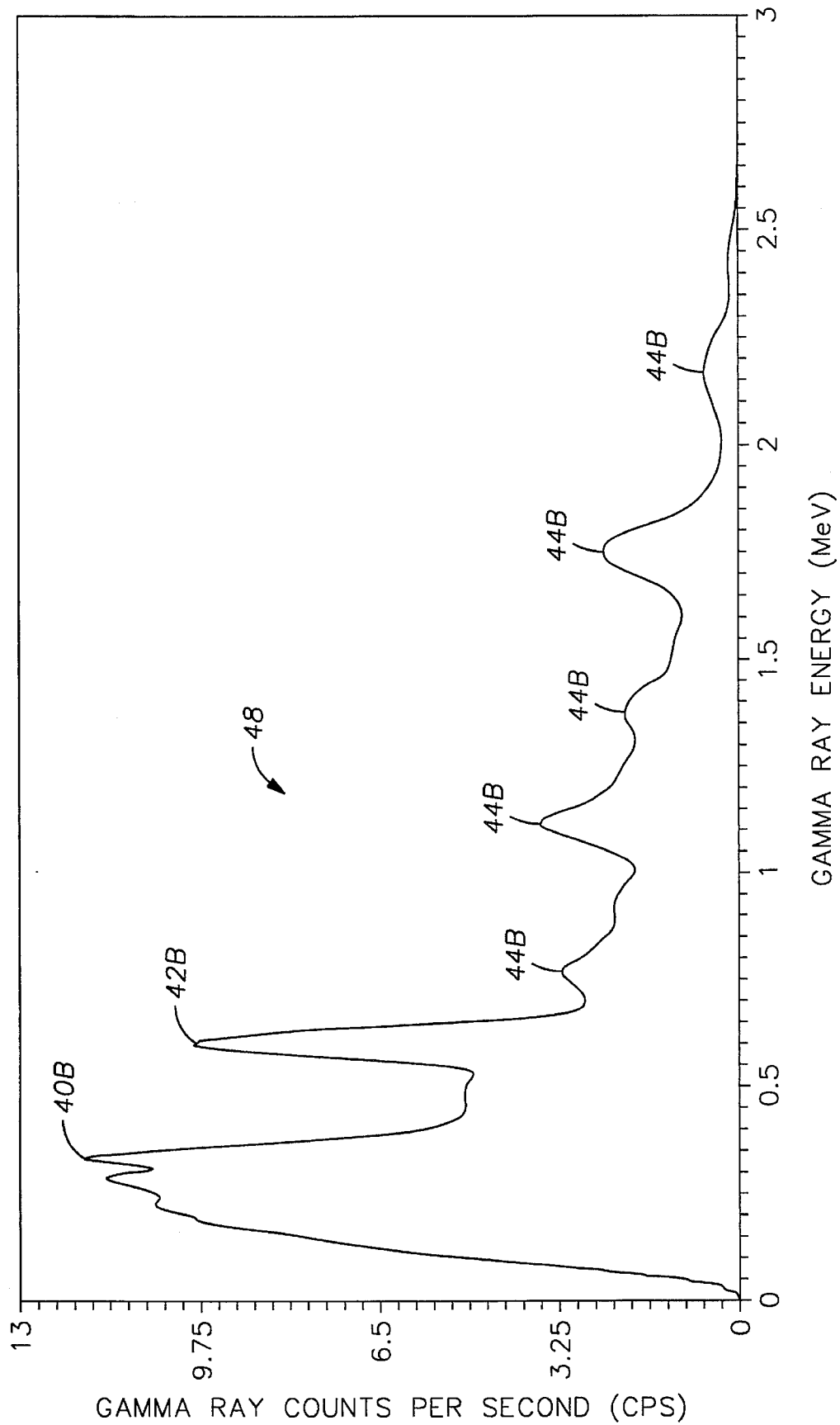
FIG. 10 shows a spectral analysis of Radium$^{226}$ emissions using the polynomial relationship of an embodiment of the present invention.

FIG. 10 is a graphic representation of the energy spectrum of Radium-226 displayed as count rate with respect to energy, again filtered into a smooth curve 48. The coordinate scales of FIG. 10 are similar those in the graph in FIG. 8. It can be observed in FIG. 10 that subtle features of the spectrum, such as secondary peaks 40B, are more clearly visible than in the graph in FIG. 8.

The scintillation crystal 12 of the preferred embodiment of the invention typically is responsive to gamma ray radiation. It is contemplated that the present invention can also be used with scintillation detectors which are responsive to other types of radiation, such as Lithium-6 glass crystals, which are also responsive to neutrons.

It is understood that the invention is not limited to the embodiment set forth herein for purposes of exemplification, but is to be limited only by the scope of the attached claims.

What is claimed is:

1. A method of analyzing the energy level of radiation detected by a radiation detector, said detector generating an output corresponding to said energy level, said detector comprising a pulse height analyzer having a plurality of channels each of said channels responsive within a different predetermined magnitude range corresponding to said output, said method comprising the steps of:

determining an empirical relationship between said energy level and said predetermined magnitude range wherein spectral peaks generated by predetermined elements, said peaks occurring within any part of an energy detecting range of said detector have peak widths spanning substantially the same quantity of contiguous ones of said plurality of channels;

causing said pulse height analyzer to conduct said output corresponding to said energy level to one of said plurality of channels having said channel number corresponding to said determined relationship.

2. The method as defined in claim 1 further comprising the step of examining the contents of each of said plurality of channels to determine an energy spectrum of said radiation imparted to said detector.

3. The method as defined in claim 1 wherein said determined relationship is an empirical relationship approximated by an ordered expression comprising a third order polynomial expression.

4. The method as defined in claim 1 wherein said pulse height analyzer comprises 256 channels.

5. The method as defined in claim 1 wherein said radiation detector is disposed within a wellbore logging instrument adapted to traverse a wellbore penetrating an earth formation.

6. A method of analyzing energy level of radiation detected by a radiation detector, said detector comprising a scintillation detector, a photomultiplier and a multichannel pulse height analyzer having a plurality of channels, each of said channels having a number, said method comprising the steps of:

measuring magnitudes of pulses from said photomultiplier in said analyzer, said pulses generated in response to detections of radiation in said scintillation detector;

causing said pulse height analyzer to conduct each of said pulses measured in said analyzer to one of said plurality of channels having said channel number corresponding to an output of an ordered expression having said magnitude of said pulses as an independent variable and a channel number corresponding to each of said plurality of channels as a dependent variable, said ordered expression calculated to substantially match an empirical relationship of said channel number with respect to said energy level determined for predetermined energy spectra, said output generated by said ordered expression in response to input of each of said magnitudes of said pulses, so that an event count of said plurality of channels is incremented each time one of said pulses is conducted to one of said plurality of channels.

7. The method as defined in claim 6 wherein said ordered expression comprises a third order polynomial function.

8. The method as defined in claim 6 further comprising the step of interrogating said event counts in said analyzer and correlating said event counts with spectral data of predetermined elements.

9. The method as defined in claim 8 further comprising the step of generating an output of said step of correlating, said output corresponding to concentrations of said predetermined elements.

10. An apparatus for analyzing the energy level of radiation, said apparatus comprising:

a detector responsive to said radiation, said detector having an energy range, said detector generating output pulses having magnitudes corresponding to the energy of said radiation detected in said detector; and a analyzer coupled to said detector, said analyzer comprising an apparatus for measuring the magnitude of said output pulses generated by said detector and a counter comprising a plurality of channels, each of said channels counting output pulses occurring within a predetermined magnitude range, said analyzer programmed responsive to a predetermined relationship of said ranges with respect to said magnitude, said predetermined relationship having substantially equal numbers of said channels spanning radiation spectral peaks occurring over substantially all of said energy range.

11. The apparatus as defined in claim 10 wherein said predetermined relationship is an empirical relationship corresponding to radiation energy spectra of predetermined elements.

12. The apparatus as defined in claim 11 wherein said empirical relationship is approximated by an ordered relationship comprising a third order polynomial function.

13. The apparatus as defined in claim 10 further comprising means for interrogating each of said plurality of channels in said analyzer to determine a number of pulses in each of said plurality of channels corresponding to numbers of radiation events having energy levels corresponding to each of said plurality of channels.

14. The apparatus as defined in claim 10 wherein said detector comprises a scintillation detector responsive to gamma rays.

15. The apparatus as defined in claim 10 wherein said detector comprises a scintillation detector responsive to neutrons.

\* \* \* \* \*